United States Patent
Liu et al.

(10) Patent No.: US 7,366,677 B1
(45) Date of Patent: Apr. 29, 2008

(54) ACCESS CONTROL FOR RENTAL CARS

(75) Inventors: Te-Kai Liu, Mount Kisco, NY (US); Michael C. Greenwood, Holmes, NY (US)

(73) Assignee: International Business Machines Corporation, Armonk, NY (US)

( * ) Notice: Subject to any disclaimer, the term of this patent is extended or adjusted under 35 U.S.C. 154(b) by 833 days.

(21) Appl. No.: 09/652,159

(22) Filed: Aug. 31, 2000

(51) Int. Cl.
*G06Q 10/00* (2006.01)
(52) U.S. Cl. .................. 705/5; 709/204; 340/5.25; 340/5.62; 340/5.72
(58) Field of Classification Search ............... 705/13, 705/5–6, 8, 10, 4; 701/201; 380/49; 382/115, 382/255; 713/200; 235/384; 709/204; 340/5.72, 340/5.6, 5.25, 5.62
See application file for complete search history.

(56) References Cited

U.S. PATENT DOCUMENTS

| | | | | |
|---|---|---|---|---|
| 4,477,874 | A * | 10/1984 | Ikuta et al. | 701/49 |
| 5,289,369 | A * | 2/1994 | Hirshberg | 705/13 |
| 5,541,571 | A * | 7/1996 | Ochs et al. | 340/5.62 |
| 5,726,885 | A * | 3/1998 | Klein et al. | 455/456.6 |

(Continued)

OTHER PUBLICATIONS

Momentum Grows FOR Microsoft Transaction Server Technology; PR Newswire; New-York; Aug. 19, 1998; pp. 1-2.*

(Continued)

*Primary Examiner*—F. Zeender
*Assistant Examiner*—Vanel Frenel
(74) *Attorney, Agent, or Firm*—Whitham, Curtis, Christofferson & Cook, PC; Stephen C. Kaufman

(57) ABSTRACT

Cars of a car rental system are made operable by having a renter present a digital key issued from the car rental system. The digital key specifies the starting date and time of a given rental transaction, and the identification of the car the key is for. The digital key is further signed by the car rental system for authenticity. A prospective renter makes online reservation over the Web and downloads into a portable storage device a digital key which can be used to operate the reserved car on the day the reservation is made for. On the pickup day, the renter goes to the car and inserts the portable storage device into a slot on the car. Upon successful verification of the digital key, the car is enabled and the renter can keep the car until he or she wants to return the car. The return process starts by having the renter obtain a invalidated digital key from the car. Once the rental car invalidates the digital key provided by the renter, the renter can no longer operate the rental car. Since the in-car controller is able to decipher the given authorization information, there is no need to re-program the in-car controller for each renter. The renter will be held liable for the rental car until he or she presents the invalidated digital key to the central station of the car rental system. To prevent a lost digital key from being used by unauthorized parties, a digital key can contain information such as a personal identification number (PIN) or a hash of the PIN of the authorized renter. For extra protection, the renter can opt to include his or her PIN in the digital key when the key is created by the car rental system. The parking lot of the car rental system can be operated without security personnel checking for proper authorization.

16 Claims, 6 Drawing Sheets

U.S. PATENT DOCUMENTS

| | | | |
|---|---|---|---|
| 5,812,067 A * | 9/1998 | Bergholz et al. | 340/5.52 |
| 5,812,070 A * | 9/1998 | Tagami et al. | 340/932.2 |
| 6,026,375 A * | 2/2000 | Hall et al. | 705/26 |
| 6,253,980 B1 * | 7/2001 | Murakami et al. | 224/510 |
| 6,380,842 B1 * | 4/2002 | Mattes et al. | 340/5.25 |
| 6,386,451 B1 * | 5/2002 | Sehr | 235/384 |
| 6,453,298 B2 * | 9/2002 | Murakami et al. | 705/8 |
| 2001/0028295 A1 * | 10/2001 | Brinkmeyer et al. | 340/5.25 |
| 2002/0013815 A1 * | 1/2002 | Obradovich et al. | 709/204 |
| 2002/0022979 A1 * | 2/2002 | Whipp et al. | 705/5 |
| 2003/0206117 A1 * | 11/2003 | Rosenberg et al. | 340/932.2 |
| 2005/0261986 A1 * | 11/2005 | Haynes et al. | 705/26 |

OTHER PUBLICATIONS

Zipcar; How does Zipcar work?; Is it for; p. 1.*

* cited by examiner

ACCESS CONTROL FOR RENTAL CARS

BACKGROUND OF THE INVENTION

1. Field of the Invention

The present invention generally relates to a car rental system and, more particularly, to a car rental system in which cars are operated by digital keys instead of conventional metal keys.

2. Background Description

In a typical car rental system today, car keys are left in cars when cars are waiting to be picked up by customers or when cars are dropped off by customers at a gated parking lot. Consequently, keys are vulnerable to be stolen or copied. It is very costly to disable a stolen key-usually an authorized car dealer or locksmith needs to be involved. It is also very dangerous when a car key is copied by a malicious person who can follow the car when it exits the parking lot, and steal the car when it is unattended.

U.S. Pat. Nos. 5,289,369 to Hirshberg and 5,812,070 to Tagami et al. disclose integrated circuit (IC) card based access control methods where each car is equipped with a IC card reader which can communicate with a cental station by wireless communications. The cards in these patents store the identifications (IDs) of the renters carrying the cards. Upon being inserted into a card reader on a rental car, the ID stored in the card is read out and sent to the cental station to check for proper authorization. In case of outage of wireless communications, the system will fail to work.

U.S. Pat. No. 4,477,874 to Ikuta et al. discloses an off-line access control method based on the secret codes stored on a car and a card. Basically, a car stores two secret codes, one for master and the other for slave. A card that carries the master secret has full control of the car, whereas the card carrying the slave secret code has limited control. For example, a slave card only authorizes the driver to start the engine but not to open the trunk lid. In such a system, if the master card is lost, the car reader has to be re-programmed with a new master secret code. This system is not suitable for a rental system since the reader on the car needs to be re-programmed for every renter.

SUMMARY OF THE INVENTION

It is therefore an object of the present invention to provide a car rental system which does not use conventional metal car keys.

It is another object of the invention to provide a car rental system where network connection from cars to a central station is not required to check whether a renter has the proper authorization to operate a car.

It is yet another object of the invention to provide a car rental system where there is no pre-processing to be done on the car to be rented for every rental transaction.

According to the invention, the cars of the car rental system can be made operable by having a renter present a digital key issued from the car rental system. The digital key specifies the starting date and time of a given rental transaction, and the identification of the car the key is for. The digital key is further signed by the car rental system for authenticity. The way a digital key gets into a renter's hand is as follows. A prospective renter makes online reservation over the Web (i.e., the World Wide Web portion of the Internet) and downloads into a portable storage device a digital key which can be used to operate the reserved car on the day the reservation is made for. On the pickup day, the renter goes to the car and inserts the portable storage device into a slot on the car. Upon successful verification of the digital key, the car is enabled and the renter can keep the car until he or she wants to return the car. The return process starts by having the renter obtain an invalidated digital key from the car. Once the rental car invalidates the digital key provided by the renter, the renter can no longer operate the rental car. Since the in-car controller is able to decipher the given authorization information, there is no need to re-program the in-car controller for each renter.

According to another aspect of the invention, the renter will be held liable for the rental car until he or she presents the invalidated digital key to the central station of the car rental system. To facilitate this, the car rental system will set up kiosks with readers to interface with the portable storage carried by the renters. The kiosks can be stationary which have a wired network connection to the cental station of the car rental system, or they can be mobile (e.g., located on a trailer, a van, a truck) which have a wireless network connection to the cental station.

To prevent a lost digital key from being used by unauthorized parties, a digital key can contain information such as a personal identification number (PIN) or a hash of the PIN of the authorized renter. For extra protection, the renter can opt to include his or her PIN in the digital key when the key is created by the car rental system.

The parking lot of the car rental system according to the invention can be operated without security personnel checking for proper authorization, hence saving labor cost and eliminating human efforts. With this advantage, the car rental system can open up more satellite rental sites which can operate around the clock. This would dramatically improve the service offering to the renters and in turn encourage more rental opportunities.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
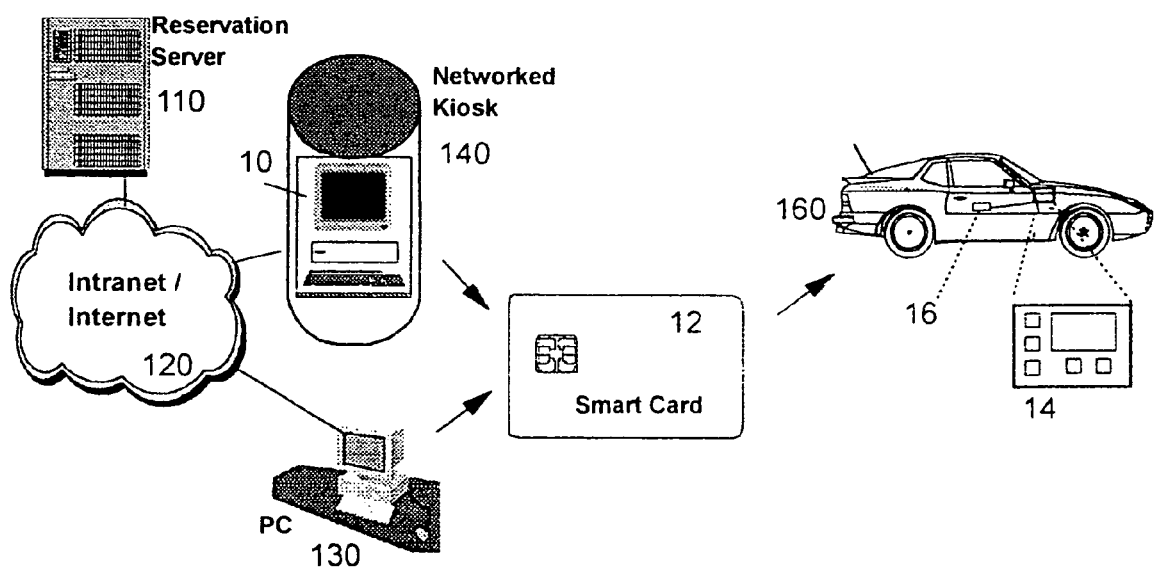
FIG. 1 is a block diagram showing the basic components of the car rental system.

Referring now to the drawings, and more particularly to FIG. 1, there is shown a block diagram illustrating the basic components of the invention. These include a computing system 10, a portable storage device 12, and an access control device 14 with a interface 16 to a portable storage inside a rental car 160.

The computing system 10 is used to make a reservation according to the needs of the renter. The computing system is also used to create and store digital keys for access to a rental car. The computing system may be located within a kiosk 140 at a car rental agency. The computing system may be a simple terminal connected through a network (i.e., an intranet or the Internet) 120 to a central reservation server 110 which accepts reservation requests, checks the availability of cars, and creates digital keys for access to the reserved cars. Alternatively, a personal computer (PC) 130 located at the home, office or other location may be used as a terminal to connect to the central reservation server 110. Either the computing system in the kiosk or the PC may be provided with means to download digital keys to a portable storage device 12.

The portable storage device is preferably a smart card issued by a car rental agency. Other memory devices may be used such as, for example, a Personal Digital Assistant (PDA), a memory card (such as the Personal Computer Memory Card International Association (PCMCIA) card), or a diskette. The manner in which a digital key is downloaded is entirely conventional.

In the case of a smart card, the renter then carries the smart card 12 to the car which contains an access control device 14. The card is inserted into the reader slot to provide the access control device 14 with the digital key generated by the computing system 10. The access control device 14 then makes a decision on whether or not to give the card holder access to the car, according to the date and time and car ID information in the digital key.

Figure 2:
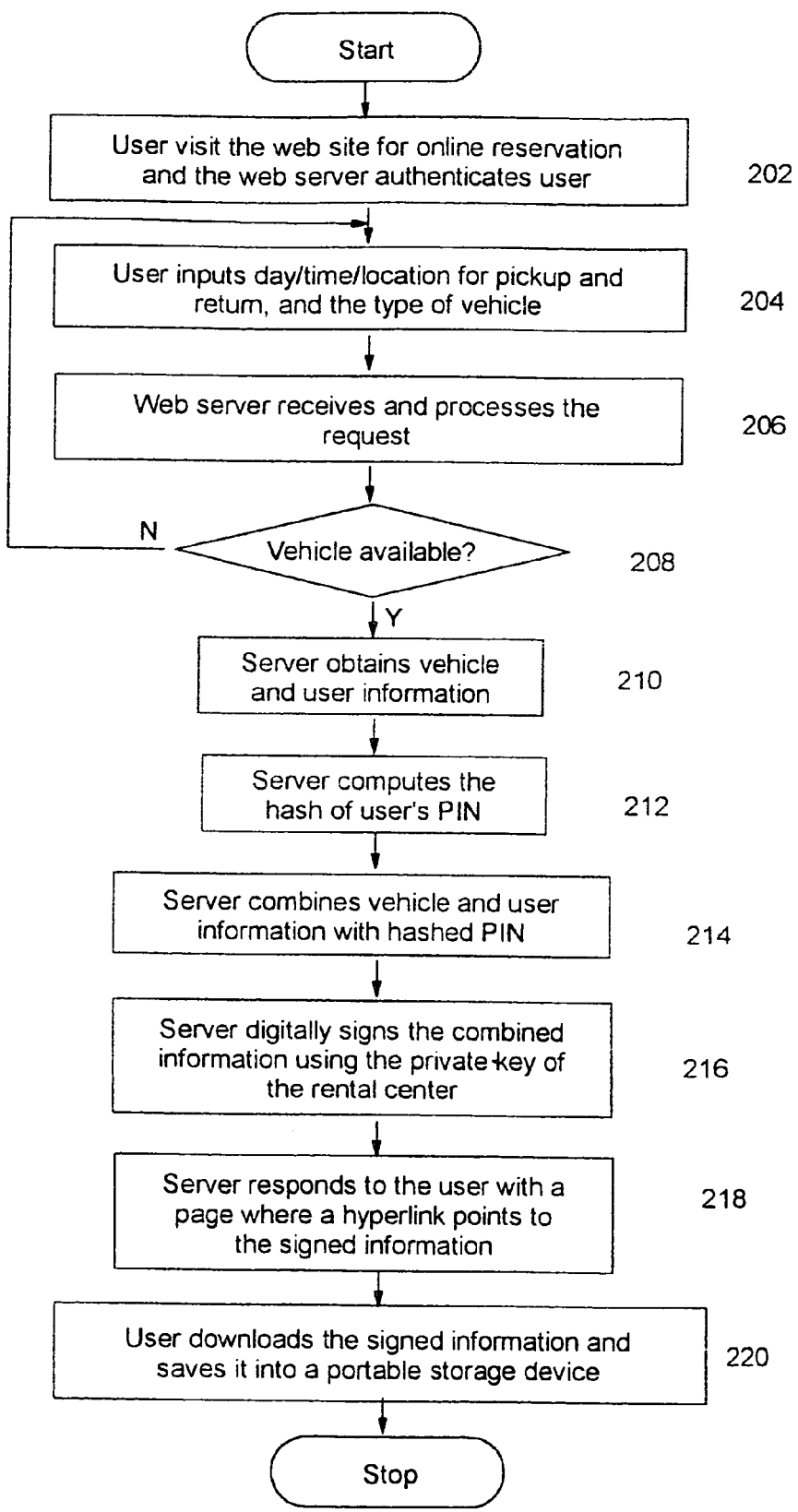
FIG. 2 is a flow diagram for the reservation process.

FIG. 2 is a flow diagram showing the reservation process executed by the reservation server 110. The reservation server 110 in the first step 202 authenticates the user visiting the reservation Web site. Upon the reservation server successfully authenticating the user (either by name and password or by a security token such as a smart card), the user is prompted for the date, time, and location for pickup and return, and the type of car in step 204. Upon the user submitting the request, the reservation server receives and processes the request in step 206. The server 110 checks the availability in step 208. If a suitable car is not available, the user is prompted to file a reservation request again in step 204. If there is a car available, the server 110 starts to create a digital key in steps 210 to 216. Specifically, the server 110 obtains car and user information (e.g., car ID and user's PIN) in step 210. The server 110 computes the hash of user's PIN in step 212. The server 110 combines car and user information with the hashed PIN in step 214. The server 110 digitally signs the combined information using the private key of the reservation server 110 in step 216. The server then responds to the user with a Web page where a hyperlink points to the signed information (i.e., digital key) in step 218. Finally the user downloads the signed information and saves it into a portable storage device 12 in step 220.

Figure 3:
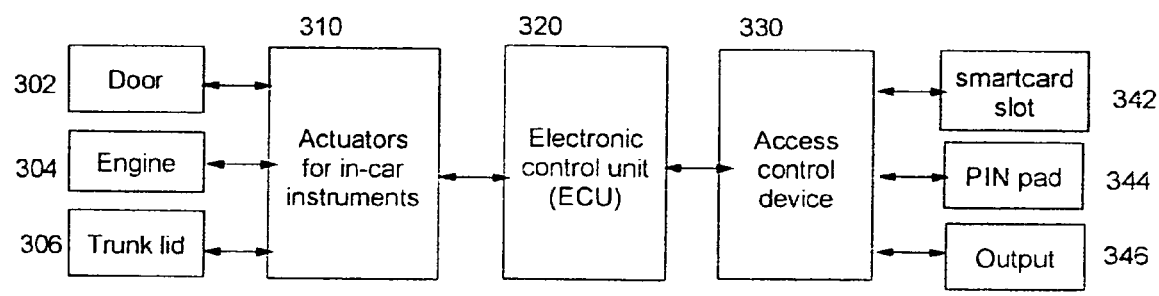
FIG. 3 is a block diagram of the in-car access control system.

FIG. 3 is a block diagram for the in-car access control system. The system includes an access controller 330, an electronic control unit 320, and actuators 310. The access controller 330 on one hand is connected to a smart card slot 342 for accepting user's smart card 12, a keypad for accepting user's PIN, and an output device such as light emitting diodes (LEDs) for signaling an error to the user. The access controller 330 on the other hand interfaces with a electronic control unit (ECU) 320 which is connected to actuators 310 in charge of actuating various in-car instruments such as doors 302, engine 304, and trunk lid 306.

Figure 4:
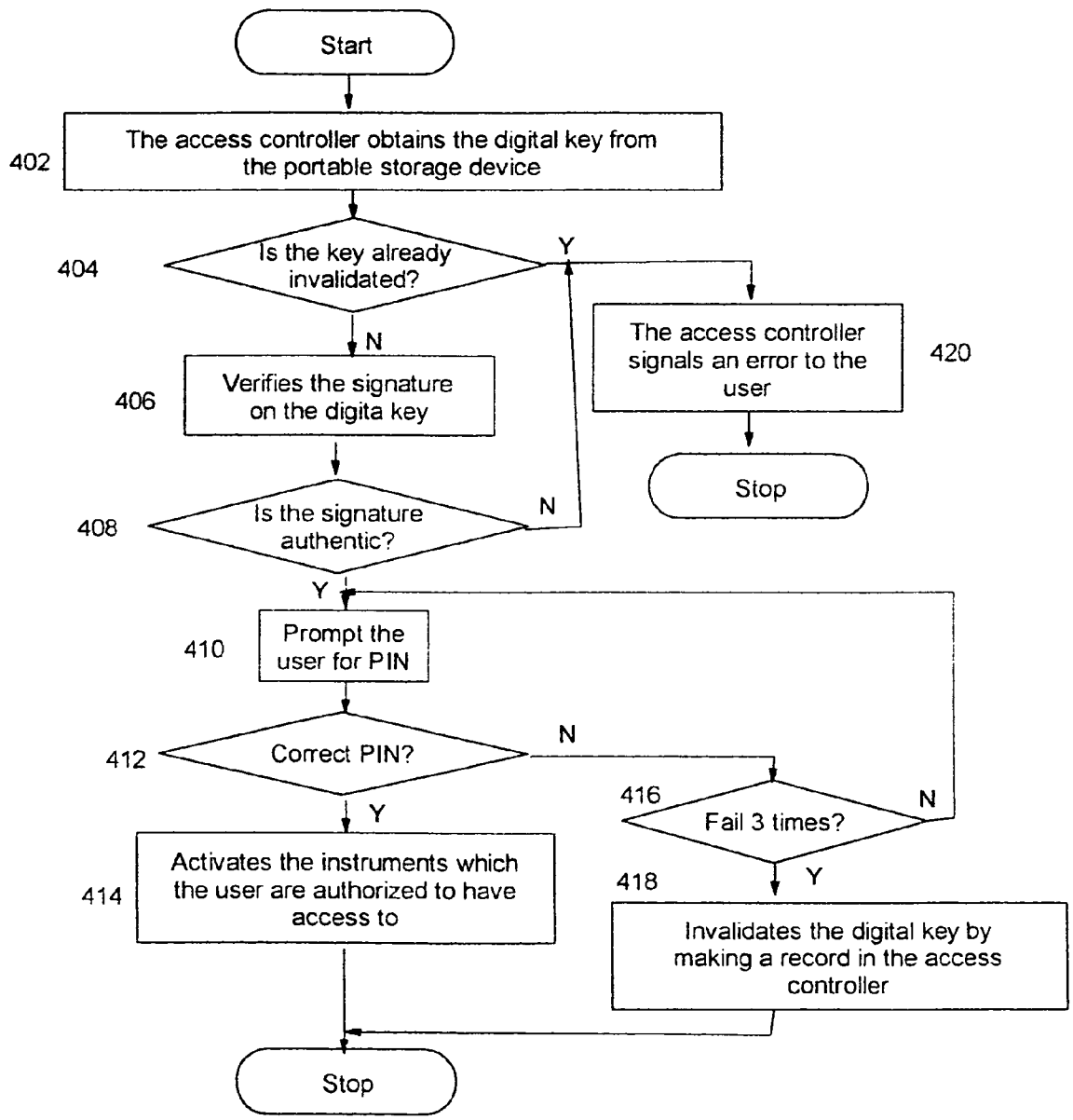
FIG. 4 is a flow diagram for the verification process implemented on the cars.

FIG. 4 is a flow diagram for the in-car access controller 330. Upon detecting a smart card inserted into the smart card slot 16, the access controller 330 obtains the digital key stored on the smart card in step 402. The access controller 330 checks whether the digital key is already invalidated in step 404. If so, the access controller 330 signals an error to the smart card holder in step 420. If the digital key is not invalidated yet, the access controller 330 verifies the signature on the digital key in step 406. If the signature is not an authentic one from the reservation server 110, the card holder is signaled an error in step 420. If the signature is genuine in step 408, the user is prompted for PIN in step 410. The controller then checks for correctness of the PIN in step 412. If the input PIN matches the one in the smart card, the access controller 330 activates the instruments which the user are authorized to have access to in step 414. If the input PIN is incorrect in step 412, the user is prompted again for the correct PIN. If the input PIN fails to match for three trials in step 416, the access controller 330 invalidates the digital key in step 418 by making a record in its storage device.

Figure 5:
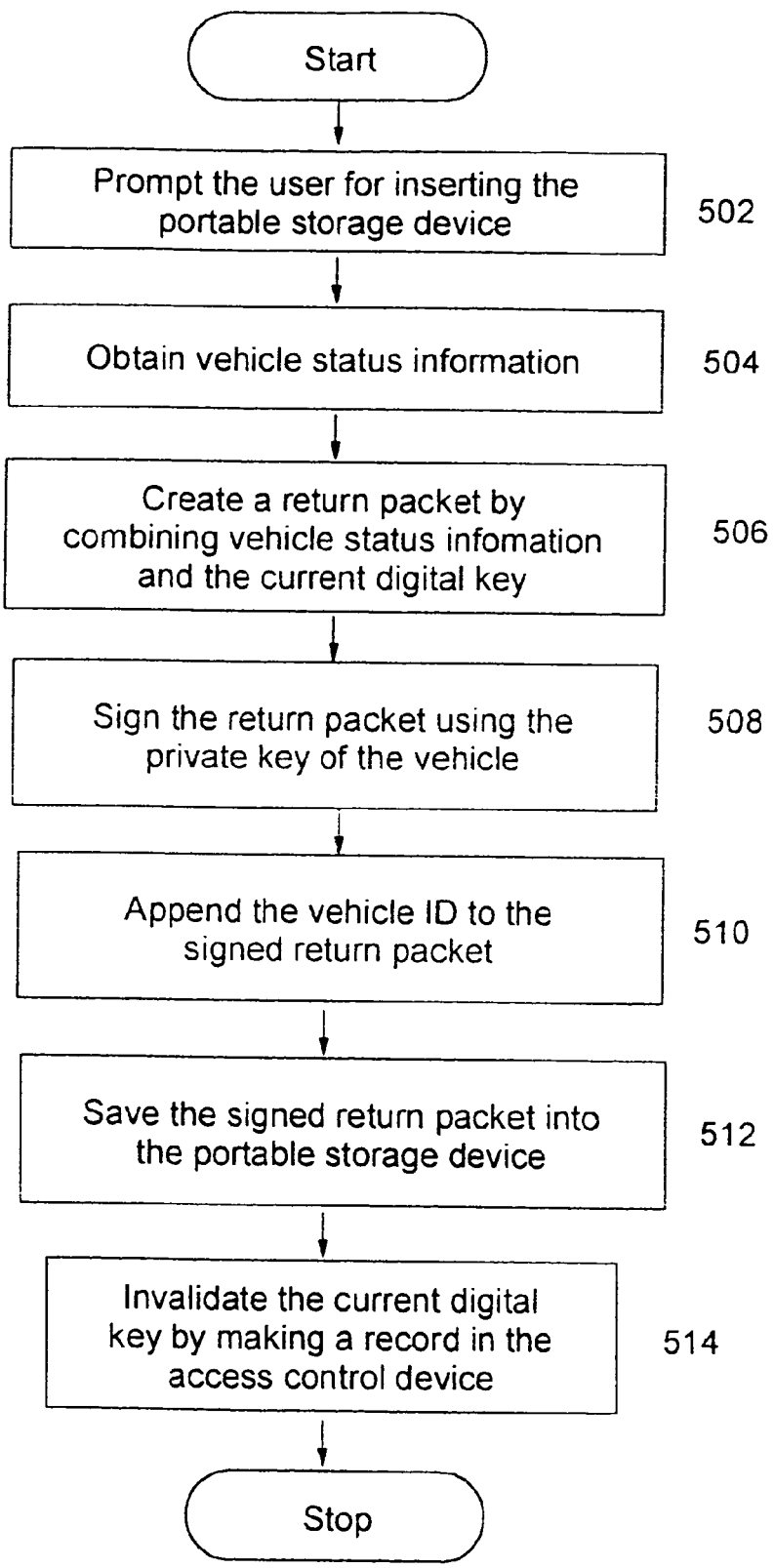
FIG. 5 is a flow diagram for the car return process implemented on the cars.

FIG. 5 shows a flow diagram for the in-car access controller 330 upon receiving the renter's request to return the car. The user is prompted for inserting his or her smart card into the smart card slot in step 502 if not already done so. The access controller 330 obtains car status information such as fuel level, mileage, current time and car ID from the ECU 320 in step 504. The access controller proceeds to create a return packet by combining car status information and the current digital key in step 506. It then signs the return packet using the private key of the car in step 508. The access controller 330 appends the car ID to the signed return packet in step 510. It then saves the signed return packet into the smart card in step 512. Finally, the access controller 330 invalidates the current digital key in step 514 by making a record in its storage device.

Figure 6:
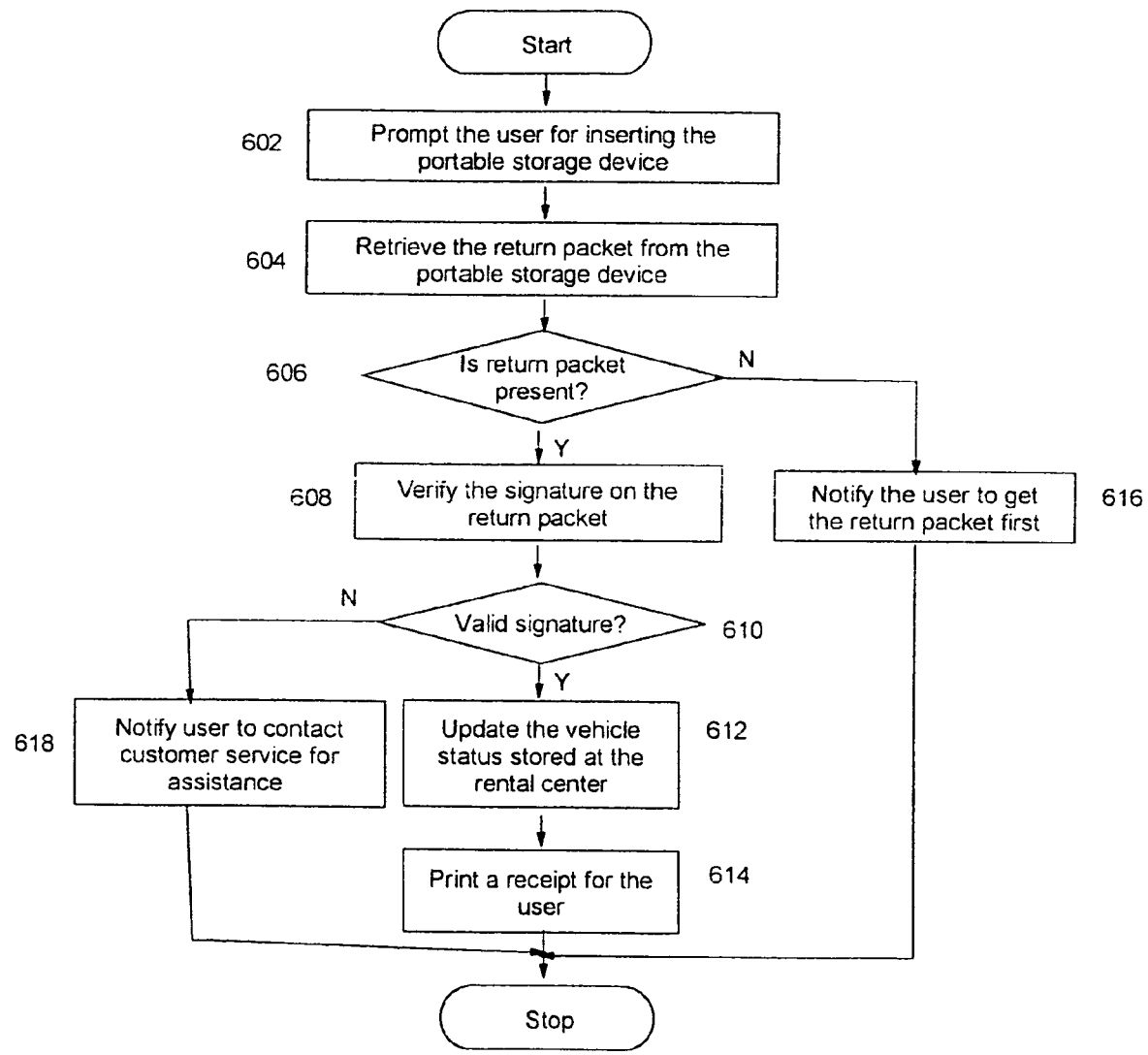
FIG. 6 is a flow diagram for the car return process implemented on a kiosk.

FIG. 6 shows a flow diagram for the kiosk 140 upon receiving renter's request to return the car. The kiosk 140 first prompts the user to insert his or her smart card in step 602. The kiosk 140 tries to retrieve the return packet from the smart card in step 604. If the return packet is not found in step 606, the user is notified to get the return packet from the car first in step 616. If the return packet is present, the kiosk verifies the signature on the return packet in step 608. If the signature is not found to be an authentic one from the car to be returned in step 610, the user is advised to contact customer service for assistance in step 618. If the signature is found to be genuine in step 610, the kiosk 140 updates the car status stored at the reservation server 110 in step 612. The kiosk 140 finally prints a receipt for the user in step 614.

While the invention has been described in terms of a single preferred embodiment, those skilled in the art will recognize that the invention can be practiced with modification within the spirit and scope of the appended claims.

We claim:

1. A car rental system comprising:
   a fleet of cars, each having an in-car access controller which is operable only when a valid digital key is presented to the car;
   a management system for handling reservation and car return, said management system including a reservation server and key generation system for generating digital keys for users of the car rental system, said key generation system storing a digital key on a portable storage device provided to a user of the car rental system, the digital key specifying a starting date and time of a rental transaction and identifying the car the digital key is for and personal information identifying the user; said information being digitally signed using a private key of the reservation server as a digital signature of the reservation server;
   the in-car access controller including means for reading the digital key on the portable storage device and verifying the digital signature of the reservation server and input means for receiving information identifying the user and comparing entered personal information with personal information identifying the user of the digital key, the in-car access controller further including means for invalidating the digital key if the entered personal information does not match the personal information identifying the user of the digital key but, otherwise, activating instruments which the user is authorized to have access to, the in-car access controller being responsive to a request from the user to return the car and including means for obtaining car status information, including fuel level, mileage, current time and car ID, and generating a return packet by combining car status information and current digital key and signing the return packet using a private key of the in-car access controller as a digital signature and saving the return packet on the portable storage device; and a key return system for processing digital keys returned by renters, the key return system invalidating the current digital key and printing a receipt for the user.

2. The system in claim 1, further comprising a parking lot guarded by a security gate, said fleet of cars being parked within confines of said parking lot when not rented by a renter of the car rental system, said security gate only opening when a valid digital pass is presented by a renter of the car rental system.

3. The system in claim 2, wherein the management system is accessed by a user over a network and the user is given a digital key to operate a particular car and a digital pass to open the gate of the parking lot where said particular car is parked, after the user completes a reservation for said particular car, said digital key and digital pass being effective starting from the time specified by said reservation.

4. The system in claim 3, wherein the user accesses the management system at a kiosk located in the parking lot where the particular car is parked.

5. The system in claim 3, wherein the user accesses the management system over the Internet.

6. The system in claim 3, wherein the key generation system stores a digital key on a portable storage device provided by the user.

7. The system in claim 6, wherein the storage device is a smart card.

8. The system in claim 6, wherein the digital key comprises car and user identification (ID) signed by the management system to authenticate the digital key.

9. The system in claim 1, wherein the key return system updates the car status stored at the reservation server.

10. A method for operating a car rental system comprising the steps of:
accessing a reservation server by a user of the car rental system to reserve a car;
authenticating the user by the reservation server and, upon the reservation server successfully authenticating the user, prompting the user for the date, time, and location for pickup and return, and a requested type of car;
checking by the reservation server an availability of the requested type of car and, if the requested type of car is available, creating by the reservation server a digital key for a car, the digital key specifying a starting date and time of a rental transaction and information identifying the car that the digital key is for and personal information identifying the user, said information on the digital key being signed using a private key of the reservation server as a digital signature of the reservation server;
downloading the digital key to a portable storage device, the portable storage device being used to gain access to a rental car;
detecting by an in-car access controller insertion of the portable storage device in a slot for receiving the portable storage device;
reading by the in-car access controller the digital key stored on the portable storage device and, if the digital key is not yet invalidated, verifying by the in-car access controller the digital signature of the reservation server on the digital key, and if the digital signature of the reservation server is verified by the in-car access controller, prompting by the in-car access controller the user to enter personal information identifying the user;
checking by the in-car access controller the personal information identifying the user entered by the user against the personal information identifying the user of the digital key and, if the personal information identifying the user entered by the user does not match the personal information identifying the user of the digital key, invalidating the digital key by the in-car access controller, but if the personal information identifying the user entered by the user matches the personal information identifying the user of the digital key, activating by the in-car access controller instruments which the user is authorized to have access to;
upon receiving a request from the user to return the car, obtaining by the in-car access controller car status information, including fuel level, mileage, current time and car ID, and creating by the in-car access controller a return packet by combining car status information and current digital key and signing the return packet using a private key of the in-car access controller as a digital signature, and saving by the in-car access controller the return packet on the portable storage device; and
invalidating the current digital key and printing a receipt for the user.

11. The method in claim 10, wherein the step of accessing the reservation server is performed via a network.

12. The method in claim 11, wherein the network is the Internet.

13. The method in claim 10, wherein the step of authenticating a user includes the steps of:
prompting the user to enter a personal identification number (PIN); and
comparing an entered PIN with a valid PIN for the user stored in the reservation server.

14. The method of claim 13, wherein the step of creating a digital key comprises the steps of:
computing a hash of the user's valid PIN;
combining car and renter identification with the hashed PIN; and
digitally signing the combined information by said reservation server.

15. The method in claim 10, further comprising the steps of:
upon receiving by the car rental system a request by the user to return a car, retrieving the return packet from the portable storage device;
verifying a signature on the return packet; and
updating the car status stored at the reservation server and printing a receipt for the user.

16. The method in claim 10, wherein the portable storage device is a smart card.

* * * * *